Feb. 22, 1966  S. P. J. KEINÄNEN  3,236,491
MOULD DEVICE FOR PRODUCING BY CASTING AN ANTI-SKID
ELEMENT TO BE FASTENED INTO THE TREAD
OF A VEHICLE TIRE
Filed Feb. 7, 1964  2 Sheets-Sheet 1

Inventor
Seio P. J. Keinänen
Attorneys

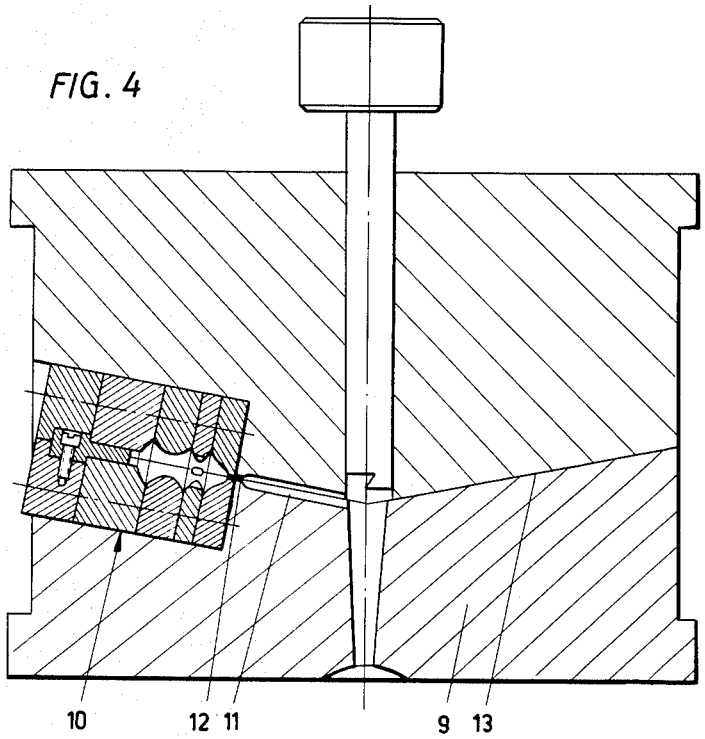
FIG. 4
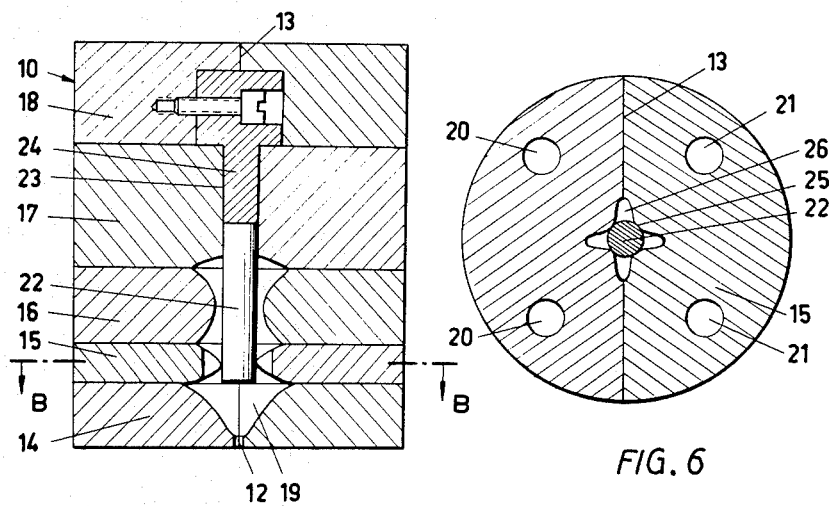
FIG. 5
FIG. 6

United States Patent Office 3,236,491
Patented Feb. 22, 1966

3,236,491
MOULD DEVICE FOR PRODUCING BY CASTING AN ANTI-SKID ELEMENT TO BE FASTENED INTO THE TREAD OF A VEHICLE TIRE
Sulo Paavo Johannes Keinänen, Nummela, Finland
Filed Feb. 7, 1964, Ser. No. 343,260
Claims priority, application Finland, Feb. 8, 1963, 244/63; Apr. 1, 1963, 599/63
3 Claims. (Cl. 249—96)

This invention relates to a mould device for producing by casting an anti-skid element to be fastened into the tread of a vehicle tire, which element has a core of hard material, around which core there is to be formed by casting and simultaneously fastened softer material, preferably a main part of plastic and an anti-skid element produced by this mould device.

The elements according to the invention are produced by casting, for example by using an injection machine when pressing the plastic into the mould, into which the above stated hard-metal plug is being arranged. The keeping of the plug in its proper place during the injection moulding has before caused some difficulty, because the injection molding takes place under a high pressure, usually an atmospheric pressure of 50–100.

The above referred difficulty has been eliminated by means of a casting device according to the invention, and besides this the injection moulding is very simple to carry out and at the same time good results are obtained.

The above casting device is mainly characterized therein that the stated plug or core member during casting is supported in the mould at least at one point when there is used a continuing, longer bar as material, which after casting is supported cut into a beforehand determined length, and which is at least at two places when using as core material which before casting is cut into fixed length.

Other characteristic features and distinctive adaptable embodiments of the element and the casting device according to the invention are described below with reference to the accompanying drawing, in which—

Figure 1:
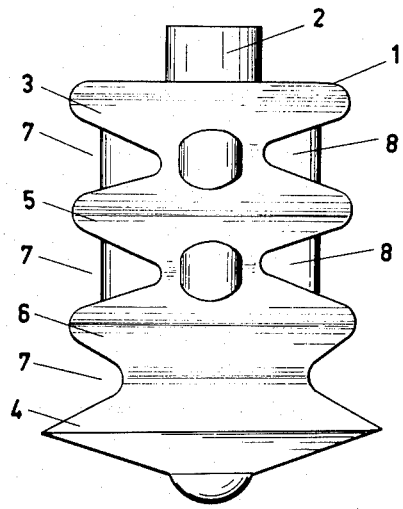
Figure 2:
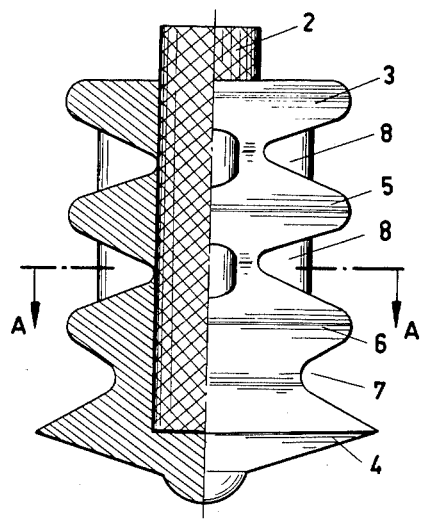
Figure 7:
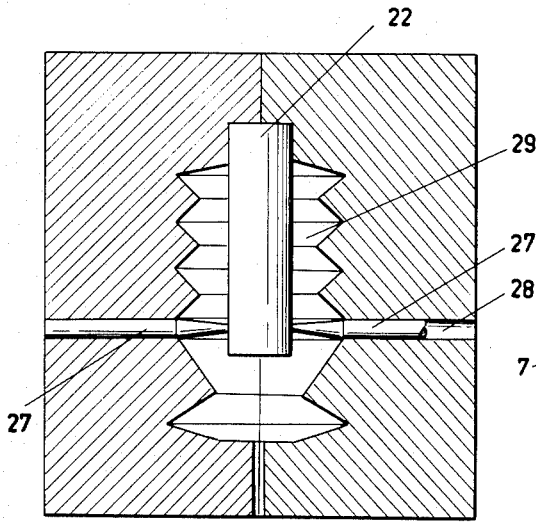
Figure 3:
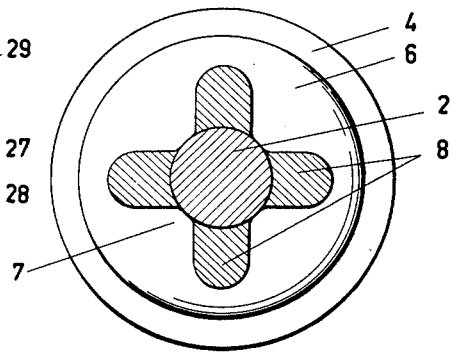

FIGURE 1 shows a preferable element according to the invention,
FIGURE 2 shows the element in partial longitudinal cross-section,
FIGURE 3 is a cross-section in the direction shown by arrow A—A in FIGURE 2,
FIGURE 4 is a general, axially taken cross-sectional view of the moulding device,
FIGURE 5 is a longitudinal cross-sectional view of the mould itself, into which the element as core in enlarged scale is arranged for casting,
FIGURE 6 is a cross-section along line B—B in FIGURE 5, and
FIGURE 7 is an axially taken cross-sectional view of the moulding device having the separate supporting pins.

The element illustrated by the drawing consists a main part 1 and a hard-metal plug 2 or the like part inside of it. The part 1 surrounding the plug 2 is provided with an upper flange 3 and a lower flange 4 and with flanges 5 and 6 placed between them. Flanges 3–6 are limited in respect with another along ring-shaped cavities, reaching as near as possible to plug 2.

As it appears from a preferred embodiment illustrated in the drawing, the flanges are tapering in radial direction, substantially outward as a cone. The lower flange 4 is in this case made conical so that it has a sharp edge in order to press itself into the rubber. The diameter of flange 4 is even greater than the greatest width of the other flanges. The upper flange 3 is suitably formed so that its top surface is horizontal or tapering somewhat at its cross-section, while its bottom surface is tapering steeply conically outwards, thus forming a sharp edge that cuts itself into the rubber. The edge of the intermediary flanges 5 and 6 as well as of a lower flange 4 is somewhat rounded.

According to the invention the main part 1 is provided with vertical ribs 8 extending radially outwards from the centre of the main part. The number of the ribs may for example be four, placed at a distance of 90° from another, and they may be arranged to be in the one only or several cavities. In the illustrated embodiment the rows are arranged into two of the upper cavities 7, in which case they in both of these cavities reach from one flange to the next one. They may just as well be arranged so that they are situated on opposite sides of the same flange, in which case the flange is situated in the middle of the rib 8, which then only reaches up to a part of the cavity. The ribs can preferably be arranged to be at the middle part of the element. These ribs support and strength the main part and the hard metal core or plug part. The ribs 8, however, do not prevent the rubber from being pressed between the flanges, thus maintaining the good resilience.

The main part may be made of any suitable material whatever, such as metal, but preferably the same can be made of plastic, in which case the main part is formed and simultaneously fastened by means of casting to plug 2. The manufacturing of the element becomes in the above manner much more simple and at the same time more economical, which also is of technical importance. As plastic there is preferably used such plastic material which has the property to shrink after cooling and which has minimal frictional effect relative the surrounding rubber, such as for example is found in "Delrin." Moreover, plastic has good isolating properties against sound and heat and it does not rust.

The casting device illustrated by the drawing consists of a frame 9, into which is arranged several moulds 10 (one shown). The material used for the element to be cast, e.g. plastic, is sprayed through duct 11 and passage 12 at the bottom of the mould into moulds 10. The frame of the casting device is along seam 13 divided into two partitions, which in a known manner are separated from another after the spray-pressing procedure, for removing the cast objects. All other details concerning spray-pressure casting are generally known and thus unnecessary to describe in connection with the present invention.

The mould 10 is divided vertically against the longitudinal, feeding direction into five separate portions 14, 15, 16, 17 and 18 correspondingly, at which the portions 14, 15, 16 and 17 are forming the actual mould chamber 19. The mould parts are in their longitudinal direction divided into halves along the dividing line 13 for opening and closing of the mould in an earlier known manner. The corresponding mould series of halves are connected to another, for example, by the bolts 20 and 21 correspondingly. The core 22 can in fixed length be fitted into the mould (FIG. 5) or the core may as a continuing bar be fed into the mould and after casting cut off at beforehand fixed point. In the first mentioned case a core 22 of a fixed length is fitted into its place in the mould (FIGS. 5 and 6), during which the same is led and supported at two points, i.e., at its upper and lower end. In the mould portion 17 is a leading duct 23 and the core 22 is placed in thus that the same in its proper position partly enters the leading duct. Against the upper end of the core is arranged a piece of cloth 24 while the spray-pressing goes on. Another leading and supporting point is arranged into the mould portion 15. In this portion the inner wall of the mould extends radially from its four points right up to the core 22. At the points 25 the inner wall may preferably extend approximately up to the core 22, said point forming a right angle, in which case these four right-angle corners are separated from another by spaces 26.

The wall of the mould thus contacts the core at points 25 along the vertical leading line in mould portion 15. For obtaining better fastening to the material in the main part, the core generally is provided with crossing grooves, and thus in practice the leading line consists of leading points (the groove points) arranged at some distance from another, in order that the material of the main part may press itself into the grooves formed between the said points. Although this arrangement has its known importance considering the strength and fastening security between the core and the main part material, the spaces 26, however, are here of a still greater significance, because on these are being formed of the main part material corresponding ribs for the element to be cast. Furthermore, the ribs act as reinforcement for the main part and support the core in the mould portion 15 thus that the strength of the cast element around the ribs is at least equal to what it is in other parts of the element, and thus the element cannot break off at this point even when exposed to greater load effects. Corresponding reinforcement points may even be arranged at other parts of the mould, especially when making an element with four or several flanges.

Without the above stated supporting points no satisfactory results can be obtained, because in considering that the spray-pressure casting has to be performed at an atmospheric pressure of 50–100, it is obvious that a core 22 with less than two supporting points can during casting move itself into any position, and if left into an inclined position in a finished element, the same is unfit for use.

It has proved advantageous to spray the casting material into the mould centrally from its lower end in direction with the axis of the core 22. For this purpose there is made a duct 12 into the bottom of the mould in the axial direction with the core.

It has often also proved preferable to use a continual core bar, which after casting is cut into beforehand fixed lengths. In this case the leading duct 23 in the mould portion 17 extends also through the mould portion 18, when the cloth 24 of course is unnecessary. In duct 23 the core bar will be supported and led along in its substantial length, in which case the use of the supporting point in moulding portion 15 becomes unnecessary, but it may even in this case be used. The core bar is suitably notched so that the distance between the notches is corresponding with the final core length, and the mould device is further provided with a mechanism which after casting cuts off the bar at the notched points. The cutting of the bar at the notched points can most simply be performed by means of a lateral pressing or bending action.

An element produced by the here above described mould device differs in its form from the element illustrated by FIGURES 1–3, but it is self-evident that the above device just as well may be adapted for production of the last mentioned element, in which case there are formed vertical ribs in two of the cavities, the ribs corresponding with the leading points of the core. Such vertical ribs may be formed at any point of the core element, and they can reach from one flange to the other, in one or several cavities, or be formed on both sides of the same flange without crossing the whole area of the cavity.

In the special embodiment of the invention illustrated in FIG. 7 the above mentioned supporting points of the moulding portion 15 are replaced by supporting pins 27, which are fixed in corresponding borings 28 in the wall of the mould. The thickness of the pins can be as small as about 1 mm. and about 0.5 mm. at the outer conical end of the pin. The pins can be made of a rigid metallic wire. These pins extend in the same way as the supporting portions described above e.g. at three or four places into the mould cavity 29 in contact with the plug 2 thus guiding and supporting the plug during the moulding process. In the finished product there are not formed any kinds of ribs, but owing to the pins there are remaining corresponding small holes in the product.

What I claim is:

1. A mould device for producing by injection moulding anti-skid elements adapted to be fastened into the tread of a vehicle tire, said anti-skid element having an elongated core of hard material embedded in a main part of softer material; said mould device comprising two mould halves contacting each other along a dividing line, each said mould half defining one half of a mould chamber being symmetrical with respect to said dividing line, the two halves of said mould chamber being aligned, a leading duct provided in said mould halves for seating and positioning the elongated core of hard material symmetrically to said dividing line and such that at least a portion of said core penetrates said chamber through one end thereof, said mould halves comprising at least one mould portion having more than two spaced radial extensions facing toward the longitudinal axis of said elongated core and having inner ends of small dimension in relation to the periphery of said core, said ends positioned to contact said core between its ends and therefore forming a support location to prevent lateral movement of said core during injection moulding, spaces provided between said extensions shaped to mould spaced vertical ribs in the main part of softer material, and an injection passage provided in said mould halves which communicates with the other end of said chamber.

2. A mould device as set forth in claim 1 wherein there are four spaced extensions symmetrically arranged about said core and spaced 90° apart from each other, and wherein two of the spaces between the four extensions are arranged on the dividing line and the other two of the spaces between the four extensions are arranged perpendicular to the dividing line.

3. A mould device as set forth in claim 1 wherein other portions of said mould halves are shaped to mould at least two longitudinally spaced transverse flange members of softer material about said core.

References Cited by the Examiner

UNITED STATES PATENTS

| | | | |
|---|---|---|---|
| 2,361,348 | 10/1944 | Dickson et al. | 18—36 XR |
| 2,604,660 | 7/1952 | Karns | 18—36 XR |
| 2,604,661 | 7/1952 | Karns | 18—36 XR |
| 2,683,899 | 7/1954 | Reichenbach | 18—36 XR |
| 2,880,462 | 4/1959 | Lehman | 18—36 |
| 2,982,325 | 5/1961 | Pellaton | 152—210 |
| 3,063,097 | 11/1962 | Jutzi | 18—36 |
| 3,124,191 | 3/1964 | Forslund | 152—210 |

J. SPENCER OVERHOLSER, *Primary Examiner.*

ARTHUR L. LA POINT, WILLIAM J. STEPHENSON, *Examiners.*